(12) United States Patent
Budano et al.

(10) Patent No.: US 11,726,576 B2
(45) Date of Patent: Aug. 15, 2023

(54) DEVICES FOR TOUCHLESS GESTURE BASED CUSTOMER ASSISTANCE SYSTEMS

(71) Applicant: Indyme Solutions, LLC, San Diego, CA (US)

(72) Inventors: Joseph Budano, San Diego, CA (US); Steven Deal, San Diego, CA (US)

(73) Assignee: Indyme Solutions, LLC, San Diego, CA (US)

( * ) Notice: Subject to any disclaimer, the term of this patent is extended or adjusted under 35 U.S.C. 154(b) by 0 days.

(21) Appl. No.: 17/507,137

(22) Filed: Oct. 21, 2021

(65) Prior Publication Data

US 2022/0391019 A1  Dec. 8, 2022

Related U.S. Application Data

(60) Provisional application No. 63/197,230, filed on Jun. 4, 2021.

(51) Int. Cl.
*G06F 3/01* (2006.01)
*G06Q 30/016* (2023.01)
(52) U.S. Cl.
CPC .......... *G06F 3/017* (2013.01); *G06Q 30/016* (2013.01)

(58) Field of Classification Search
CPC ...... G06F 3/017; G06Q 30/016; G06Q 20/20; G06Q 30/0641
See application file for complete search history.

(56) References Cited

U.S. PATENT DOCUMENTS

| | | | |
|---|---|---|---|
| 9,760,177 B1* | 9/2017 | Ramaswamy | G06F 3/017 |
| 2013/0342448 A1* | 12/2013 | Tanaka | G06F 3/017 345/156 |
| 2016/0260142 A1* | 9/2016 | Winkle | G06Q 30/0601 |
| 2021/0056341 A1* | 2/2021 | Jubner | B60R 21/01538 |
| 2021/0110144 A1* | 4/2021 | Shanmugam | G06V 40/20 |

* cited by examiner

*Primary Examiner* — Mark Edwards
*Assistant Examiner* — Chayce R Bibbee
(74) *Attorney, Agent, or Firm* — Lewis Kohn & Walker LLP; David M. Kohn

(57) ABSTRACT

A system for allowing an individual to request assistance in a retail environment, the system comprising: (a) providing a physical device comprising at least one sensor, wherein the at least one sensor is capable of recognizing a set of gestures; (b) providing software to distinguish unwanted gestures from desired gestures within the set of gestures; (c) providing a means of communicating a notification to store associates within the retail environment; and (d) providing a means of resetting or canceling the request for assistance. Alternatively, the device may house a low power secondary sensor that is capable of detecting motion and/or the heat signature of a human hand.

30 Claims, 4 Drawing Sheets

DEVICES FOR TOUCHLESS GESTURE BASED CUSTOMER ASSISTANCE SYSTEMS

FIELD OF THE INVENTION

The present invention pertains generally to customer assistance systems. More particularly, the present invention pertains to devices for providing customer assistance by receiving touchless gestures from a user in order to deliver appropriate assistance responses.

BACKGROUND OF THE INVENTION

During the COVID-19 pandemic, there was a heightened sensitivity to health and safety protocols. This sensitivity was especially felt in gathering place like the retail environment. To remain open during the pandemic, stores had to implement sanitation protocols for anything that was touched by a customer such as shopping carts, payment pin pads, and service counters. Whole new systems were created to eliminate physical contact such as touchless curbside pickup, and touchless payment methods. As we move past the pandemic, this heightened sensitivity to touching things that are in a public location such as a retail shop will remain. The pandemic certainly educated the population on how germs and diseases are transmitted through touch. The trend towards touchless devices is expected to continue and as such was the driving force for this invention.

In a retail environment, customers need access to store associates for certain activities. These activities include, to ask a question about a product, to access to locked merchandise, to get service at un-staffed service counters, to access heavy or difficult to convey merchandise etc. Often times, finding a store associate may be difficult. To solve this problem of accessing service where and when shoppers need service, without adding staff in an uneconomical manner, retailers will install help buttons at these store "pinch points." These pinch points are where a lack of timely service will likely result in lost sales. A help button is generally a battery-operated device that allows a customer to notify a store associate by pressing a button. It is highly desirable for these devices to be battery operated since typical retail shelves do not have power readily available. They also come in several form factors such as a "Blade" style where a sign blade is affixed to a shelving system with an integrated button, a counter top model for being mounted on a service counter, a wall mount for being mounted on a support pole or wall, and a glass mount for mounting on locked merchandise case.

Now imagine 50 random shoppers touching these buttons in a retail store before you arrive. These days, there would be a great resistance to touching this device for fear of touching something that has not been cleaned (possibly ever) and has been touched many times a day by the general public. Given the heightened sensitivity to touching public surfaces, having a touchless help device would be highly desirable to provide customers a sanitary means to access store associates.

This touchless problem could be solved in many ways, however, all the alternate methods to a physical device at the point of service present issues. QR codes are available today and have gained popularity via online—touchless menu options at restaurants and bars. These could be used in a retail setting; however, you need a smart phone to activate it. This limits the population of shoppers who can easily access help to those with a cell phone. You could notify store associate with an App on your cell phone. Unfortunately, for use this method you not only need a smart phone but also you must download an App, further limiting the user population. In addition, this can be activated from anywhere in the store, making it more difficult for the store associate to identify where to go or which shopper asked for assistance. Placing silicone covers over the traditional help buttons allows them to be sanitized frequently, however, this requires additional staff costs and is unreliable.

There is a need in the art for systems capable of accommodating consumer specific responses upon receiving touchless gestures.

SUMMARY OF THE INVENTION

The present invention provides for a system for allowing an individual to request assistance in a retail environment, the system comprising:

(a) providing a physical device comprising at least one sensor, wherein the at least one sensor is capable of recognizing a set of gestures;

(b) providing software to distinguish unwanted gestures from desired gestures within the set of gestures;

(c) providing a means of communicating a notification to store associates within the retail environment; and (d) providing a means of resetting or canceling the request for assistance. Optionally, the at least one sensor, once activated, detects certain gestures within the set of gestures, including at least one selected from the group consisting of moving a hand from left to right, moving a hand from right to left, moving a hand orthogonal from the right to left motion, moving a hand orthogonal to the left to right motion, moving a hand from an initial height above the sensor to a height below the initial height, moving a hand from the initial height above the sensor to a height higher than the initial height, placing a hand in the detection zone and holding it in place for a duration of time. Preferably, the certain gestures within the set of gestures are within a prescribed proximity to the at least one sensor. More preferably, gestures outside of the prescribed proximity of the sensor are filtered and ignored.

In another aspect, the physical device has a display providing information to the individual. Optionally, the physical device has at least one sign providing instructions to the individual. Alternatively, the display can be a digital sign where promotional messages can be played and periodically updated. In an alternative embodiment, the physical device has a speaker which can play audible messages. Preferably, the speaker can play audible promotional messages and can be played either with video via the display or independent from the display. In yet another alternative configuration, the physical device has a visual que indicating to the user when it is activated. Preferably, the physical device can be reset either through gestures or a physical button on the device. Most preferably, the physical device comprises a detection zone that is substantially "C" or "U" shaped, wherein the at least one sensor only detects gestures contained within the "C" or "U" shaped detection zone.

In yet another aspect, the system can be remotely programmed to alter its features and capabilities.

In an alternative embodiment, the present invention further provides for a system for customers to request assistance through touchless gesturing in a retail environment, the system comprising:

(a) providing a physical device, wherein the physical device houses a primary sensor and a secondary sensor, wherein the primary sensor is capable of recognizing gestures and the secondary sensor is a low power sensor capable of recognizing or detecting motion;

(b) integrating a software platform into the physical device;

(c) installing a set of gestures into the software platform, wherein the software can distinguish unwanted gestures from desired gestures within the set of gestures;

(d) providing a means of communicating a notification to store associates within the retail environment; and (e) providing a means of resetting or canceling the request for assistance. Preferably, the secondary sensor detects human motion or the heat signature of a human hand, and triggers the primary sensor to activate. More preferably, the primary sensor, once activated, detects certain gestures within the set of gestures, including at least one selected from the group consisting of moving a hand from left to right, moving a hand from right to left, moving a hand orthogonal from the right to left motion, moving a hand orthogonal to the left to right motion, moving a hand from an initial height above the sensor to a height below the initial height, moving a hand from the initial height above the sensor to a height higher than the initial height, placing a hand in the detection zone and holding it in place for a duration of time. Preferably, the certain gestures within the set of gestures are within a prescribed proximity to the at least one sensor. More preferably, gestures outside of the prescribed proximity of the sensor are filtered and ignored.

In another aspect, the physical device of this alternative embodiment is battery operated. Optionally, the physical device has a display providing information to the customers. Preferably, the physical device has at least one sign providing instructions to the customers. Alternatively, the display can be a digital sign where promotional messages can be played and periodically updated. In an alternative embodiment, the physical device has a speaker which can play audible messages. Preferably, the speaker can play audible promotional messages and can be played either with video via the display or independent from the display. In yet another alternative configuration, the physical device has a visual que indicating to the user when it is activated. Preferably, the physical device can be reset either through gestures or a physical button on the device.

In yet another aspect, the system can be remotely programmed to alter its features and capabilities. Preferably, the physical device the physical device comprises a detection zone that is substantially "C" or "U" shaped, wherein the primary sensor detects gestures contained within the "C" or "U" shaped detection zone. More preferably, those gestures which fall outside of the "C" or "U" shaped detection zone are not detected by the primary sensor.

In another aspect, the "C" or "U" shaped detection zone comprises a feature that forms a physical barrier which prevents the primary sensor from sensing unwanted gestures outside of the "C" or "U" shaped detection zone. Alternatively, the secondary sensor's field of view is constrained via an aperture or special lensing which narrows the secondary sensor's field of view to detect motion only in the detection zone. Optionally, the field of view of the secondary sensor is the interior of the "C" or "U" shape of the physical device.

Although the gesture activated device could be a powered device from an ordinary wall plug, it is preferable that the gesture activated device is battery operated, wherein the physical device has an integrated gesture sensor. Optionally, the device is capable of wirelessly notifying a store associate using an existing communication method presently deployed within the retail environment. These communications devices used by store associates can be walkie talkies, smart devices, the store overhead PA system, personal communicators or any device used to communicate among store associates.

More preferably, once notified, a store associate within the retail environment can approach the individual and initiate a separate gesture in order to reset the system.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF THE INVENTION

Detecting and Filtering Gestures

The physical device operates in a retail environment. This means a wide variety of customers will interact with merchandise at merchandise displays, such as in-aisle shelving, and with store associates over service counters. For a gesture-based customer assistance device to effectively operate in a retail environment, it is absolutely critical that the system be capable of filtering out normal, indiscriminate customer gestures that they initiate while shopping and interacting with store associates, from deliberate gestures designed to initiate a help request.

Figure 1:
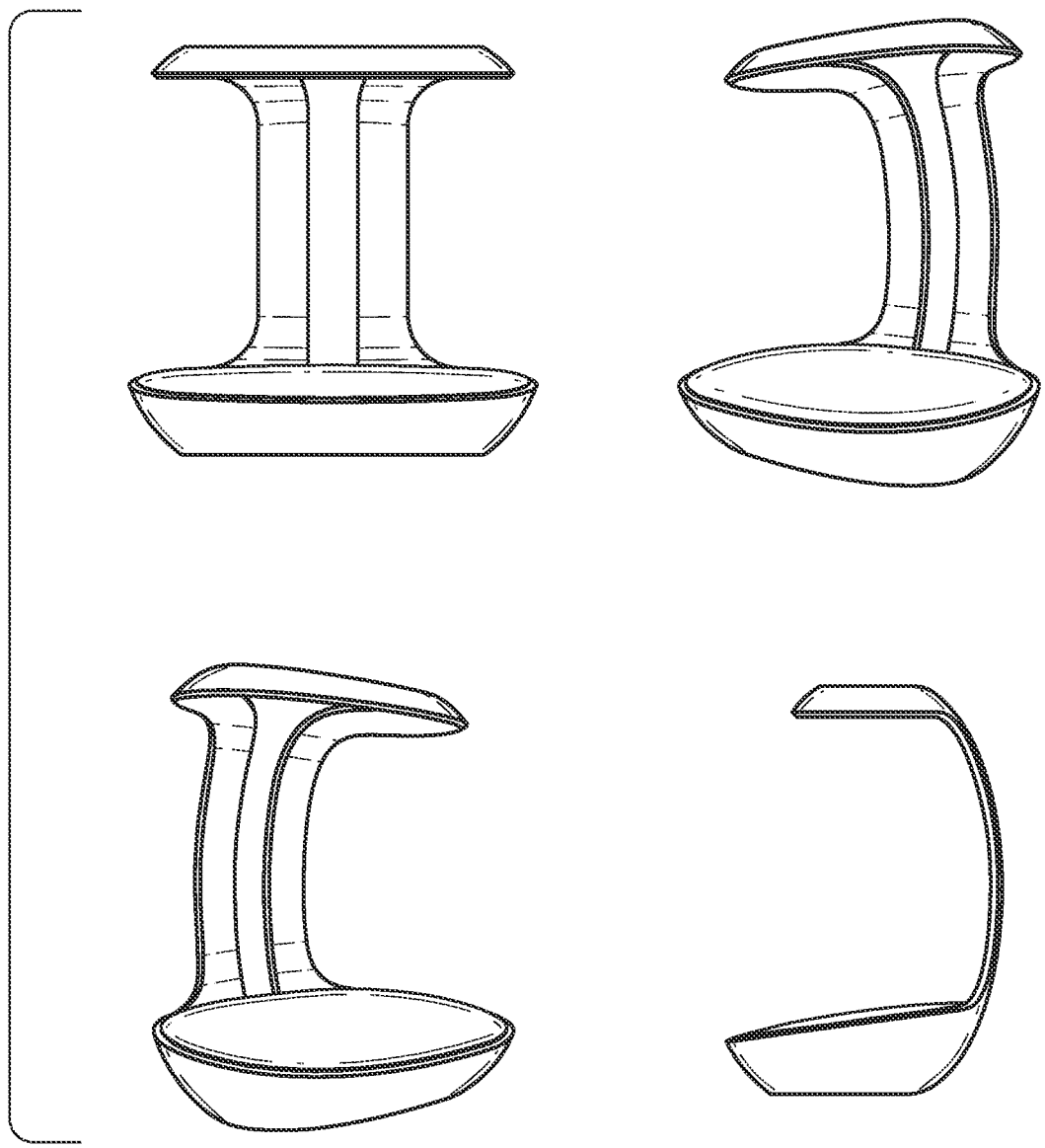
FIG. 1 illustrates an overview of the preferred embodiments of the touchless, gesture-based assistance devices of the present invention.
Figure 1:
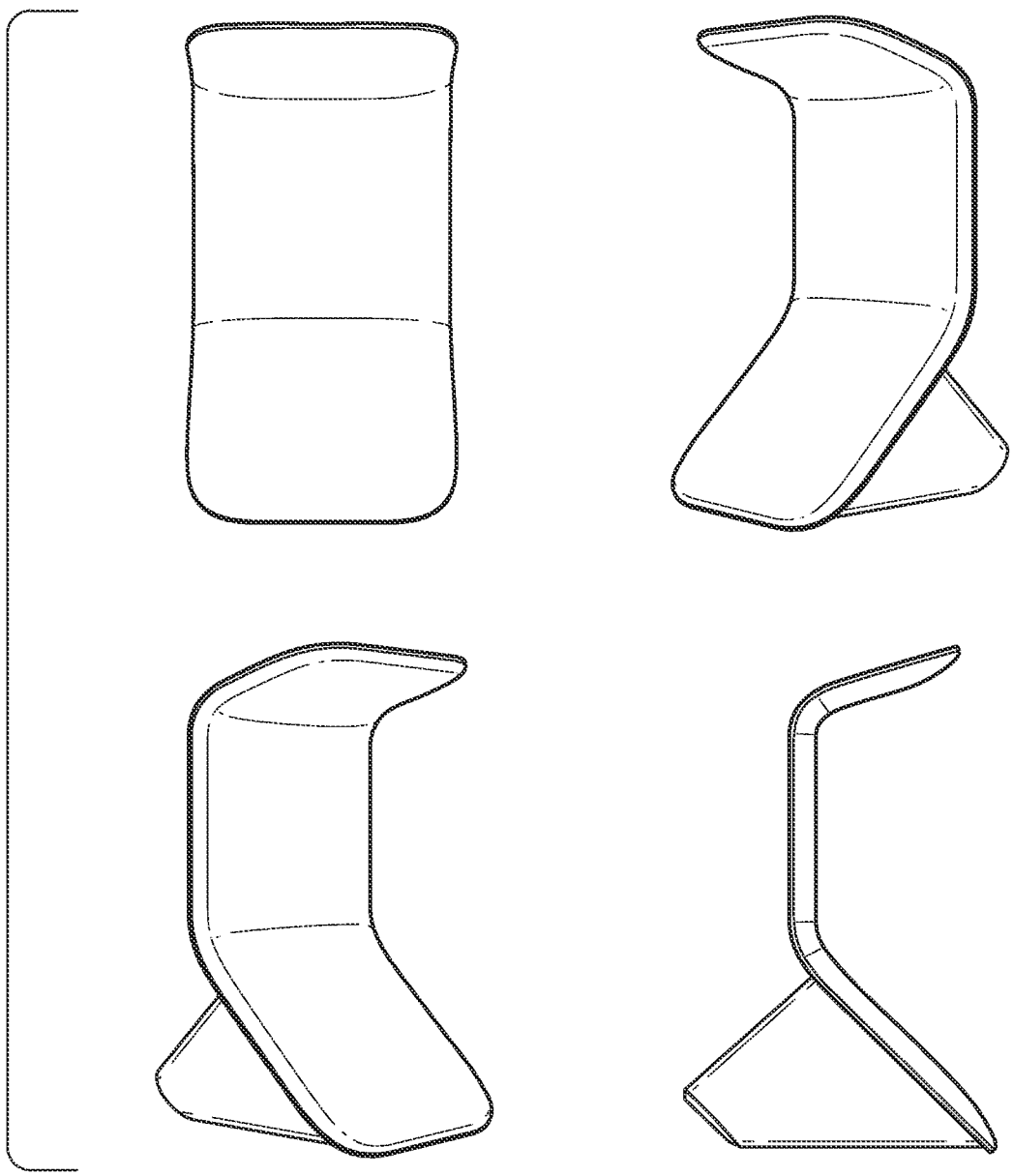
Figure 1:
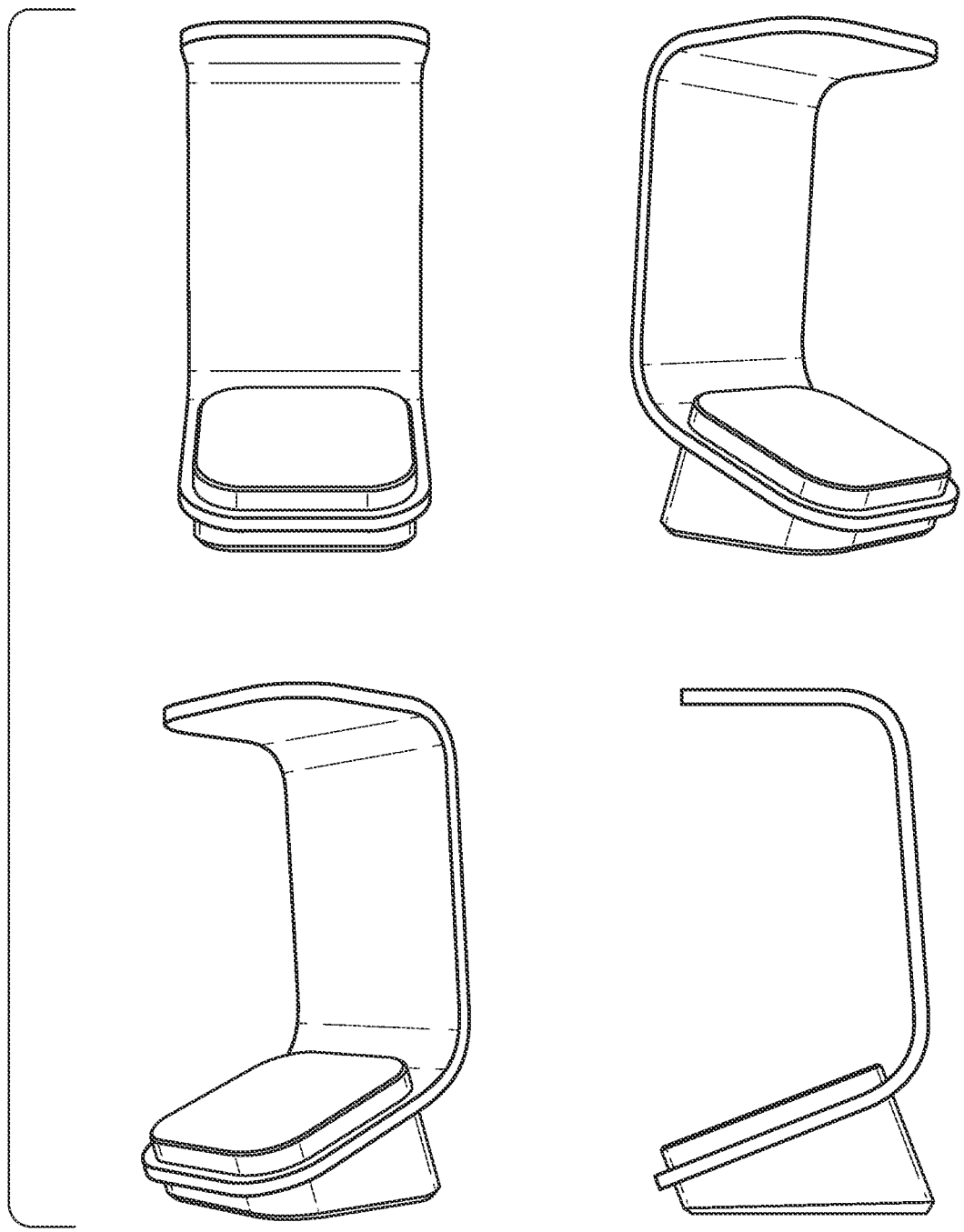
Figure 1:
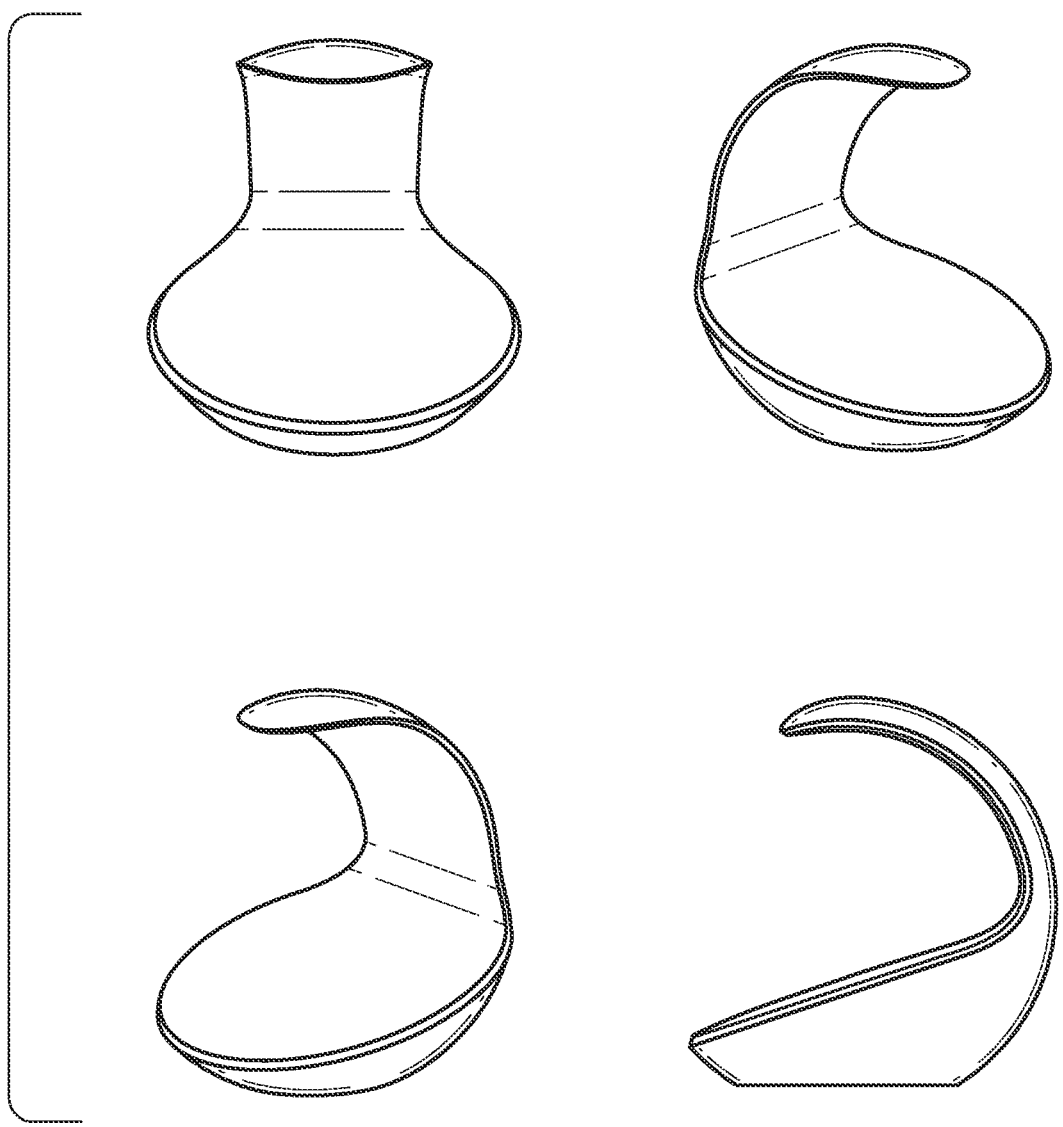

FIG. 1 represents four alternative embodiments of the physical devices described in the present invention.

The gesture sensor of the present invention has the capability to identify specific gestures such as moving your hand from right to left, or from left to right. If we use the compass analogy, from North to South, from South to North, from East to West, and from West to East. It can also detect a downward hand motion, analogous to slapping your hand down on a virtual button. The sensor can also detect a hand inserted into the detection zone and dwelling there without moving. These very specific gestures are known as qualified gestures. The present invention relies on certain inputs both by the individual shopper and the store associate. The shopper initiates a gesture to activate the system. The store associate initiates separate gestures to reset the system and cancel the alert.

The sensor is capable of filtering for these specific qualified gestures. This basic gesture filtering will eliminate some but not all of the ambient gestures happening in a retail setting. For example, in a preferred embodiment, the present invention provides for a gesture-based help device mounted to a shelf sensing the environment in proximity to the shelf. If a shopper walks by, the arm and hand swinging motion associated with a human walking simulates one of the qualified gestures and could result in a false alarm. This is an example of "false gestures" that need to be filtered out to minimize the false alarms which could be generated by the system without proper filtering.

Some of this filtering is done by only sensing qualified gestures which are initiated within a limited physical proximity to the sensor. For example, gestures which are initiated within 1 to 6 inches of the senor housed in the physical device are analyzed for qualified motion, while gestures further away are ignored. A secondary sensor can also be added which senses the heat signature of the detected gesturing element. This heat sensing sensor is able to filter out cool items such as metal, plastic, paper, fabric etc. from human body parts such as a hand.

A mechanical shield could be introduced to physically block the sensor from seeing false gestures outside of a limited space called the detection zone. This embodiment requires an aperture of some kind into which the hand must be placed to be seen by the sensor. For example, one embodiment is a substantially "C" or "U" shaped enclosure where the hand must be placed inside the C" or "U" to be seen by the sensor. By swiping your hand right to left or left to right, or any motion which is identified as a qualified gesture, could be detected but any arbitrary gesturing not specifically in the detection zone would be invisible to the sensor by means of the mechanical shadowing created by the enclosure.

Setting and Resetting the Device

When a shopper requests assistance using this device, this is known as a Set Event. When a store associate arrives at the device to assist the shopper, the store associate deactivates the device, thereby stopping any further escalation messages and also notifying other store associates that this shopper has been assisted. This deactivating of the device is known as a reset event. In one embodiment, a shopper can activate a device by waving their hand from right to left in the detection zone. The store associate can simply insert their hand into the detection zone and hold it stationary for some period of time and the device will be reset.

Power and Battery Operation

In a retail environment, getting power to the shelves and fixtures where this device would be deployed is often times costly and problematic. Although this invention could operate on normal AC wall power, it is desirable that the invention be battery operated with a battery life exceeding three years. Current gesture detecting sensors utilize significant power to operate. This requirement is acceptable when the device is powered by AC power. When battery operated, this gesture sensor power requirement would result in an unacceptable battery life. To solve this problem, a secondary very low power sensor is utilized to detect a human hand in the detection zone. This secondary sensor can be a variety of technologies including Passive Infrared sensors, or any other form of motion or heat detecting sensor. Once the secondary sensor detects a hand in the detection zone, it activates the gesture sensor which detects any qualified gesture. In this way, the duty cycle of the high-power gesture sensor is minimized allowing for an acceptable battery life.

This low-power secondary sensor may have a wide field of view. This would be undesirable as it could cause the secondary sensor to identify unwanted gestures outside of the detection zone. If these unwanted gestures are in fact detected, it would unnecessarily activate the primary high-power sensor and degrade the battery life. In one embodiment, the secondary sensor would be mounted in such a way as to mask the field of view such that the field of view would be limited. This masking could be accomplished by mounting the sensor under an aperture. The size of the aperture serves to constrains the field of view of the sensor. The masking could also be accomplished through specialized lensing over the sensor. This specialized lensing has the effect of constraining the sensor's field of view. Using any method of masking or lensing which constrains the secondary sensor's field of view, the masked sensor's field of view would be constrained to only detect human motion in the detection zone. For example, the secondary low-power sensor would be mounted on one side of the C" or "U" shaped device and could only detect motion within the detection zone. In this way the secondary sensor field of view would be only focused on the opposite side of the C" or "U" shaped element such that any unwanted gestures would be masked by the physicality of the C" or "U" shaped device.

Signage and Self-Instructions

The physical devices itself must instruct the shopper how to utilize the system. This is accomplished through signage or the physical shape to the device itself. Preferably, icons indicating the qualified motions are represented and are easily understandable by the customer.

The physical device can have an electronic display which can provide both instructions to the customer on how to use the device, plus promotional messages programmed by the retailer. This display can have dynamic content which could be changed from time to time.

Notification Methods

Once the shopper initiates a qualified gesture, the shopper facing device will confirm it is activated by means of an audible message such as a tone or voice recording letting the shopper know a store associate has been notified. The device can also activate on-board LED lights which when activated, provide an additional means of notifying the customer that the device has been activated. Through one of more of these shopper notification methods, the shopper can then be assured that their gesture has resulted in an activation of the system.

The customer assistance device has a means of communicating this customer-initiated assistance requests wirelessly either over a wireless network or some other wireless communications means to a controller to a cloud-based software application which contains application software. This application software contains an interface to the store associate's communications device, an alarm application, a notification application, and the system configuration parameters. These configuration parameters include, the alarm code (a means of uniquely identifying the device requesting assistance), the message to be delivered to the store associate (where they must go to provide service), the escalation frequency (how often reminder messages are sent), a timer calculating the time from the customer request to the "reset" initiated by the store associate once they arrive at the customer location, a reset message delivered to the store associate indicating that shopper has been helped.

The application software is capable of delivering a message to store associate via a variety of methods. The preferred method of notifying store associates is over their existing communication methods. These include, 2-way radios, smart phones, pagers, the store PA system or cordless phones for example. The system can deliver audio messages via a 2-way radio for example, or it can notify digitally via an app on a smart device or any combination of the above.

Move Add and Change

In addition to these elements, the application software has the capability to be re-configured "over the air" via the interface to the communications network. The gesture-based device can also be reconfigured using a sequence of gestures. These re-configuration methods can be used to update the application software of the customer facing device over the wireless communications means, implement "move, add, and change" elements which changes the configuration of the customer facing devices, collect health monitoring data from the system devices to report their online and offline status as well as other relevant parameters such as signal strength, battery life status, software revision, and other relevant system health parameters.

We claim:

1. A system for allowing an individual to request assistance in a retail environment, the system comprising:
   (a) providing a physical device comprising at least one sensor, wherein the at least one sensor is capable of recognizing a set of gestures and wherein the at least one sensor is not a camera;
   (b) providing software to distinguish unwanted gestures from desired gestures within the set of gestures;
   (c) providing a means of communicating a notification to store associates within the retail environment; and
   (d) providing a means of resetting or canceling the request for assistance,
wherein the physical device is substantially shaped in the form of a "C" or a "U" and comprises a detection zone that is substantially "C" or "U" shaped, wherein the at least one sensor only detects gestures contained within the "C" or "U" shaped detection zone and wherein those gestures which fall outside of the "C" or "U" shaped detection zone are not detected by the at least one sensor.

2. The system of claim 1, wherein the at least one sensor, once activated, detects certain gestures within the set of gestures, including at least one selected from the group consisting of moving a hand from left to right, moving a hand from right to left, moving a hand orthogonal from the right to left motion, moving a hand orthogonal to the left to right motion, moving a hand from an initial height above the sensor to a height below the initial height, moving a hand from the initial height above the sensor to a height higher than the initial height, placing a hand in the detection zone and holding it in place for a duration of time.

3. The system of claim 2, wherein the certain gestures within the set of gestures are within a prescribed proximity to the at least one sensor.

4. The system of claim 3, wherein gestures outside of the prescribed proximity of the sensor are filtered and ignored.

5. The system of claim 1, wherein the physical device has a display providing information to the individual.

6. The system of claim 1, wherein the physical device has at least one sign providing instructions to the individual.

7. The system of claim 1, wherein the physical device has a speaker which can play audible messages.

8. The system of claim 1, wherein the physical device has a visual que indicating to the user when it is activated.

9. The system of claim 1, wherein the physical device can be reset either through gestures or a physical button on the device.

10. The system of claim 1, wherein the system can be remotely programmed to alter its features and capabilities.

11. The system of claim 5, wherein the display can be a digital sign where promotional messages can be played and periodically updated.

12. The system of claim 7, wherein the speaker can play audible promotional messages and can be played either with video via the display or independent from the display.

13. The system of claim 1, wherein the "C" or "U" shaped detection zone comprises a feature that forms a physical barrier which prevents the at least one sensor from sensing unwanted gestures outside of the "C" or "U" shaped detection zone.

14. A system for customers to request assistance through touchless gesturing in a retail environment, the system comprising:
   (a) providing a physical device, wherein the physical device houses a primary sensor and a secondary sensor, wherein the primary sensor is capable of recognizing gestures and the secondary sensor is a low power sensor capable of recognizing or detecting motion and wherein neither the primary sensor nor the secondary sensor is a camera;
   (b) integrating a software platform into the physical device;
   (c) installing a set of gestures into the software platform, wherein the software can distinguish unwanted gestures from desired gestures within the set of gestures;
   (d) providing a means of communicating a notification to store associates within the retail environment; and
   (e) providing a means of resetting or canceling the request for assistance,
wherein the physical device is substantially shaped in the form of a "C" or a "U" and comprises a detection zone that is substantially "C" or "U" shaped, wherein the primary sensor detects gestures contained within the "C" or "U" shaped detection zone and wherein those gestures which fall outside of the "C" or "U" shaped detection zone are not detected by the primary sensor.

15. The system of claim 14, wherein the secondary sensor detects human motion or the heat signature of a human hand, and triggers the primary sensor to activate.

16. The system of claim 15, wherein the primary sensor, once activated, detects certain gestures within the set of gestures, including at least one selected from the group consisting of moving a hand from left to right, moving a hand from right to left, moving a hand orthogonal from the right to left motion, moving a hand orthogonal to the left to right motion, moving a hand from an initial height above the sensor to a height below the initial height, moving a hand from the initial height above the sensor to a height higher than the initial height, placing a hand in the detection zone and holding it in place for a duration of time.

17. The system of claim 16, wherein the certain gestures within the set of gestures are within a prescribed proximity to the sensor.

18. The system of claim 17, wherein gestures outside of the prescribed proximity of the sensor are filtered and ignored.

19. The system of claim 14, wherein the physical device is battery operated.

20. The system of claim 14, wherein the physical device has a display providing information to the customers.

21. The system of claim 14, wherein the physical device has at least one sign providing instructions to the customers.

22. The system of claim 14, wherein the physical device has a speaker which can play audible messages.

23. The system of claim 14, wherein the physical device as a visual que indicating to the user when it is activated.

24. The system of claim 14, wherein the physical device can be reset either through gestures or a physical button on the device.

25. The system of claim 14, wherein the system can be remotely programmed to alter its features and capabilities.

26. The system of claim 20, wherein the display can be a digital sign where promotional messages can be played and periodically updated.

27. The system of claim 22, wherein the speaker can play audible promotional messages and can be played either with video via the display or independent from the display.

28. The system of claim 14, wherein the "C" or "U" shaped detection zone comprises a feature that forms a physical barrier which prevents the primary sensor from sensing unwanted gestures outside of the "C" or "U" shaped detection zone.

29. The system of claim 14, wherein the secondary sensor's field of view is constrained via an aperture or special lensing which narrows the secondary sensor's field of view to detect motion only in the detection zone.

30. The system of claim 29, wherein the field of view of the secondary sensor is the interior of the "C" or "U" shape of the physical device.

\* \* \* \* \*